May 1, 1973 W. C. McCARTHY ET AL 3,730,690

LIQUID-LIQUID CONTACTING MEANS

Original Filed July 30, 1969

INVENTORS
W. C. McCARTHY
M. V. DeLANO, JR.

BY

*Young & Quigg*

ATTORNEYS

3,730,690
Patented May 1, 1973

3,730,690
LIQUID-LIQUID CONTACTING MEANS
William C. McCarthy and Merritt V. De Lano, Jr., Bartlesville, Okla., assignors to Phillips Petroleum Company, Bartlesville, Okla.
Continuation of application Ser. No. 845,958, July 30, 1969. This application Oct. 18, 1971, Ser. No. 190,286
Int. Cl. B01d 11/04
U.S. Cl. 23—270.5  9 Claims

ABSTRACT OF THE DISCLOSURE

In a mass transfer device of the liquid-liquid extractor type using contacting trays, an improved upcomer conduit providing communication between tray zones is provided with a multiplicity of apertures at its lower extremity.

---

This is a continuation of application Ser. No. 845,958 filed July 30, 1969 now abandoned.

This invention relates to apparatus for the countercurrent contacting of immiscible fluids.

In one of its more specific aspects, this invention relates to apparatus for recovering the components of one liquid by extraction of those components from that liquid by absorption in a second liquid.

Continuous multi-stage countercurrent liquid-liquid extraction is well known. Generally, this process is conducted with a column containing a number of perforated plates. Contact is effected by causing one phase to flow in a generally upward direction through the column while the other phase flows in a generally downward direction through the column. Generally the light phase is the continuous phase while the heavy phase is the discontinuous phase.

Frequently, sieve type or perforated trays are employed with the discontinuous phase flowing downward through the perforations of the tray and into contact with the continuous phase which flows across that area between plates or trays.

In most operations, a multiplicity of such contacting zones are provided, each contacting section being provided with a plate and a fluid transfer conduit, or upcomer, extending above and below the plate, the upcomer having an open end in each of the contacting sections. Accordingly, the continuous phase rises through the upcomer, leaving it at its upper end, passes across the contact zone and into the lower end of the next upwardly extending upcomer. The operation of the extraction process is frequently limited as to its effectiveness in operation. The continuous phase frequently entrains the discontinuous phase and carries it up through the upcomer. This entrainment decreases the efficiency of the process. It has been found that limitations in the operation of the system are imposed by such upcomers acting to limit the total throughput through the tower and also the efficiency of the extraction.

The apparatus of this invention is an improved or vertical fluid transfer conduit extending between such contacting sections which makes possible not only the improved column throughputs or loading but increased extraction efficiency. According to this invention there is provided in the upcomer conduit a multiplicity of apertures providing communication between the contacting sections and the internal of the conduit proximate the horizontally disposed tray.

The apparatus of this invention will be more readily understood when explained in conjunction with the appended drawings in which FIG. 1 is a cross-sectional view of one embodiment of this invention.

It will be understood that a plurality of conduits may supply communication between contacting zones although the subsequent discussion will be expressed in terms of a single such conduit.

Figure 1:
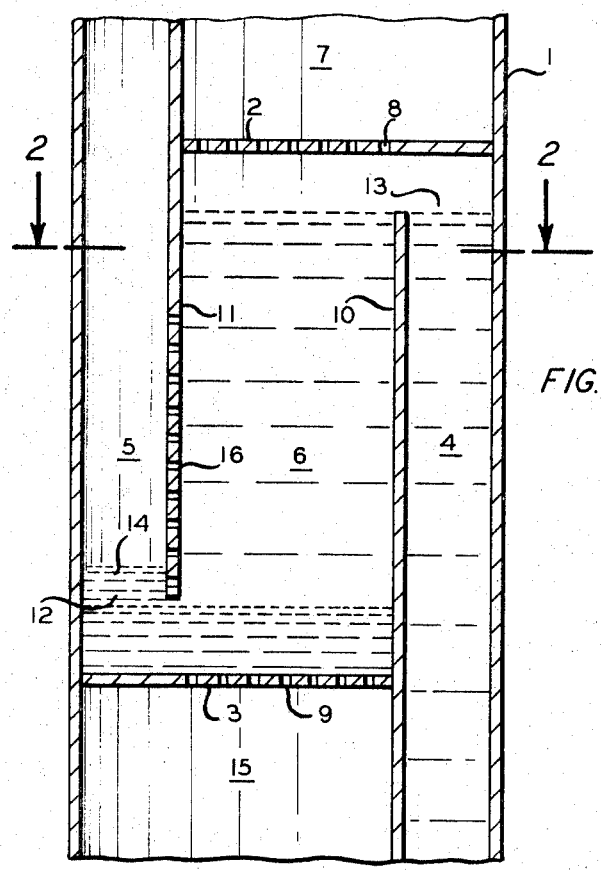

Referring now to FIG. 1, there is shown an elevational view of extraction tower 1 having installed therein apertured plates 2 and 3 with vertical fluid transfer conduits or upcomers 4 and 5 extending between contacting sections 6 and 7. In the operation of this tower, that lighter fluid rising from the next tray below tray 3 rises through upcomer 4, passes from it through its upper opening 13 and passes across contacting section 6 to the bottom of transfer conduit or upcomer 5 having wall 11. The fluid then passes up through upcomer 5 and rises into the next contact zone 7 above tray 2.

In its traversal of contacting section 6, the lighter fluid is contacting with the heavier liquid accumulated on tray 2 which passes through the apertures 8 thereof. The heavier liquid accumulates on apertured tray 3 and passes through its apertures 9 to repeat the process in the next contact section 15 below tray 3.

Above the more dense liquid on tray 3 and extending for some distance into upcomer 5 is a layer or mixed phase 14 comprising both the heavier and lighter materials, the separation of which, at this point, is significant in respect to the overall efficiency of the process.

This invention contemplates a conduit upcomer 5 having a multiplicity of apertures 16 disposed in its proximate its lower opening 12 to provide open communication through wall 11 between zone 6 and the internal of upcomer 5.

Figure 2:
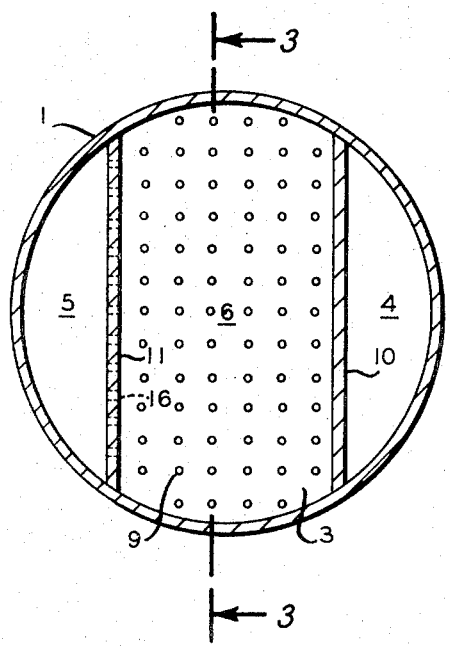
FIG. 2 is a plan view of a section of a contact zone taken through section 2—2 of FIG. 1.

Referring now to FIG. 2, there is shown upcomers 4 and 5 in their relative positions to tray 3 and the apertures 9 thereof and the multiplicity of apertures 16 in wall 11 of upcomer 5.

Figure 3:
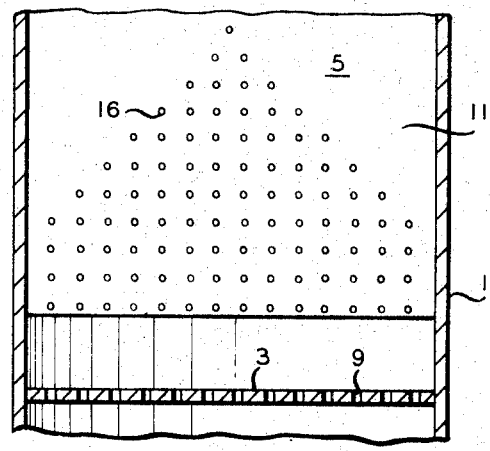
FIG. 3 is an enlarged view in elevation of the lower extremity of the conduit in relation to the tray.

Referring now to FIG. 3, there is shown the lower portion of upcomer 5 in elevational view 3—3 of FIG. 2. In FIG. 3, in which like parts have like numbers, it will be seen that as contemplated by the apparatus of this invention the lower portion of upcomer 5, and as applicable to all upcomers, has been adapted with a multiplicity of apertures 16 which penetrate wall 11 of upcomer 5 and which provide open communication between zone 6 and the interior of upcomer 5 above opening 12 in its lower extremity.

The apertures 16 which are formed in the lower extremity of the wall of the upcomer provide a multiplicity of openings which facilitate mixed phase separation.

These apertures may be of any configuration although substantially circular apertures are most conveniently used. They may be arranged on any pitch in relation to each other though triangular pitch possesses certain advantages.

The total pattern formed by the multiplicity may be of any convenient configuration although the pattern will preferentially be of triangular or such configuration that for each decrease in interface level exposing the apertures, the new area so exposed to the light phase will be greater than that so exposed for the last preceding drop in level of the same magnitude.

While the position of the apertures in the wall of the upcomer may be made at any point along its height with some improvement resulting, that positioning in which the apertures were positioned upwardly from a locus immediately adjacent to the lower extremity of the upcomer were found most satisfactory. Similarly, they are preferably positioned across substantially the full width of the upcomer at the lower extremity of the upcomer.

Circular apertures having a diameter of from about 0.0625 inch to about 0.50 inch are satisfactory. Preferably, circular apertures having a diameter of from about 0.25 inch to about 0.375 inch are employed. The total area of the aperture in any one upcomer will be from about 2 to about 20 percent of the internal cross-sectional area of the column. Generally, the area of an individual upcomer will be about 5 to about 20 percent of the total tray area, preferably about 10 to about 15 percent of the total tray area.

The number of apertures will be based upon the above parameters. No particular number is preferred.

In order to illustrate the advantages accruing to the use of the apparatus of this invention a series of runs was made in which various designs were employed in respect to the lower extremity of the upcomer. These data are shown in Table I.

All runs were made under conditions of liquid-liquid extraction between a hydrocarbon feed comprising a mixture of isoprene and 2-methyl butene-2 and a solvent comprising a methyl carbitol, sulfolane-water mixture. Operations were conducted in the conventional manner at an average tower temperature of about 130° F. and atmospheric pressure.

All runs were made in a liquid-liquid extractor containing 10 trays on 12 inch spacing. The tower had a 4 inch internal diameter, each tray having an area of 12.6 square inches. Each tray contained 16 one-quarter inch diameter holes. The chord formed by the straight wall of the upcomer was 3⅛ inches long.

The following designs were employed in the various runs as regards the lower extremity of the wall of the upcomer.

No. 1—That described in U.S. Patent 2,909,414 to Gerhold et al., vertical wall 12 of FIG. 3 thereof being centrally notched at its lower extremity, the notch taking the form of a triangle having a 1¼ inch base and a ⅝ inch altitude.

No. 2—Lower extremity of upcomer wall centrally notched, the notch taking the form of a triangle having a ⅝ inch base and a 1¼ inch altitude and one ⅛ inch aperture located 3⅛ inch above apex of triangle on altitude of triangle.

No. 3—The wall as described in No. 2, but with two additional ⅛ inch apertures located 1 inch below aperture, spaced at 2 inches.

No. 4—One embodiment of the apparatus of this invention in which the wall contained fifty-three ⅛ inch diameter apertures on random spacing, the apertures being positioned over an area of 12 square inches, the total area of the apertures being 5.2 percent of the cross-sectional area of the tray.

No. 5—One embodiment of the apparatus of this invention in which the wall contained thirteen ¼ inch diameter apertures on random spacing, the apertures being positioned over an area of 5 square inches, the total area of the apertures being 5.1 percent of the cross-sectional area of the tray.

Results were as follows:

TABLE 1

| Design | Flow rates, lb./hr. | | Maximum allowable throughput, gals./hr./sq. ft. tower area | Tray efficiency, percent |
| --- | --- | --- | --- | --- |
| | Feed | Solvent | | |
| 1 | 120 | 432 | 1,097 | 32.7 |
| 2 | 120 | 420 | 1,093 | 42.6 |
| 3 | 130 | 455 | 1,193 | 55.8 |
| 4 | 150 | 525 | 1,347 | 40.1 |
| 5 | 160 | 560 | 1,443 | 60.7 |

The data illustrate the operability of the apparatus of the present invention. They relatedly indicate that the apparatus of the present invention provides an increase in the maximum allowable throughput of the tower and an increased separation efficiency over that of the apparatus having the next highest throughput and the next highest efficiency. Both throughput and tray efficiency of design No. 5 are appreciably higher than that of design No. 1. These improvements allow construction of a liquid-liquid extraction tower of smaller diameter and of reduced height.

Tests were made in a 12 inch internal diameter extractor containing 32 trays on a 12 inch spacing. The feed and absorbent compositions were as in the previous runs. In these tests, maximum throughput rates and tray efficiencies were determined.

Runs were made comparing two upcomers. No. 6 was of the design of the previously-described No. 1 except comparable in overall dimensions to that of No. 7 described below.

No. 7 was of the design of the apparatus of this invention. It was of that embodiment illustrated in FIG. 3 of the drawings. The overall width of the upcomer was 9⅞ inches. Within a centrally-located rectangular area having a width of 8 1/16 inches and a height of 3⅜ inches were contained about four hundred and thirty ⅛ inch diameter apertures on ¼ inch triangular pitch. Above this rectangular area, and contiguous with it, was a triangular area having a base of 8 1/16 inches and a height of 2⅜ inches which contained about one hundred and twenty ⅛ inch diameter apertures on ¼ inch triangular pitch. The total area of the apertures was about 8.6 square inches, the equivalent of about 7.65 percent of the inside area of the tower.

The lower edges of the upcomers were located, in both instances, about 4 inches above the trays.

Results were as follows:

TABLE II

| Design | Throughput, gal./hr./sq. ft. tower area | Tray efficiency, percent |
| --- | --- | --- |
| 6 | 1,185 | 50.6 |
| 6 | 1,295 | 49.7 |
| 6 | 1,370 | 38.2 |
| 6 | 1,470 | 36.9 |
| 6 | 1,660 | 36.0 |
| 7 | 1,538 | 71.0 |
| 7 | 1,660 | 65.4 |
| 7 | 1,715 | 64.2 |
| 7 | 1,767 | 63.1 |

These data again indicate the operability of the apparatus of this invention. Inspection of these data indicate that at comparable throughputs, the apparatus of this invention produces a tray efficiency approximately 30 percent greater than that tray efficiency exhibited by the No. 5 tray design.

Test data in columns of other sizes has indicated that with unnotched upcomers having an apertured area of 8.2 percent, tray efficiencies are about 40 percent greater than those upcomer designs conventionally employed with the average pressure drop across the trays being well within acceptable limits. Similar improved results have been obtained with the aperture area limits previously specified when employing ¼ inch apertures or ⅛ inch apertures on either square or random layouts. Similarly, comparable improvements over conventional designs have been experienced regardless of the nature of the solvent or charge stock concerned.

It will be appreciated that various modifications can be made to the apparatus of this invention in light of the above disclosure. Such, however, are considered as being within the scope of the invention.

What is claimed is:

1. In a liquid-liquid contacting column comprising a plurality of contiguous contacting sections, each of said sections comprising a horizontally disposed perforated sieve-type tray and a vertically disposed fluid transfer conduit extending above and below said tray, said tray having no risers or bubble caps, the improvement comprising said vertically disposed fluid transfer conduit being formed by a vertically disposed member affixed to said tray, said conduit being of substantially uniform area throughout its length and being comprised of a single inner wall formed by said member, said conduit having an upper open end and a lower open end, said member extending to a locus beneath the locus to which the upwardly extending end of the vertically disposed fluid transfer conduit from the next lower contiguous section extends, but not to said next lower tray, said member having disposed only in its lower portion beneath the locus to which the upwardly extending end of the vertically disposed fluid transfer conduit from the next lower contiguous section extends a multiplicity of apertures adapted for the passage of fluid therethrough.

2. The apparatus according to claim 1 in which said apertures are positioned in said vertically disposed conduit across substantially the full width of said conduit at its lower extremity, the number of said apertures decreasing upwardly along the length of said conduit.

3. The apparatus according to claim 1 in which said apertures are positioned in a rectangular pattern positioned below and contiguous with a triangular pattern.

4. The apparatus according to claim 1 in which said apertures are positioned across substantially the full width of the fluid transfer conduit.

5. The apparatus according to claim 1 in which said apertures are positioned in a triangular configuration.

6. The apparatus according to claim 1 in which said apertures have a diameter of from about 0.0625 inch to about 0.50 inch.

7. The apparatus according to claim 1 in which the total area of said apertures in said fluid transfer conduit is from about 2 to about 20 percent of the internal area of the contacting section.

8. The apparatus according to claim 6 in which said apertures have individual diameters from about 0.25 inch to about 0.375 inch.

9. The apparatus according to claim 7 in which the horizontal cross sectional area of said transfer conduit is from about 10 to about 15 percent of the area of the horizontal cross sectional area of said contacting section.

References Cited

UNITED STATES PATENTS

| | | | |
|---|---|---|---|
| 3,053,521 | 9/1962 | Plaster | 261—114 |
| 3,231,251 | 1/1966 | Scheibel | 261—114 |
| 1,886,957 | 11/1932 | Huff | 261—114 |
| 3,103,545 | 9/1963 | Korelitz | 261—114 |
| 2,909,414 | 10/1959 | Gerhold | 23—270.5 |
| 3,583,856 | 6/1971 | Landau | 23—270.5 |

FOREIGN PATENTS

| | | | |
|---|---|---|---|
| 1,270,957 | 7/1961 | France | 202—158 |
| 1,016,237 | 9/1957 | Germany | 202—158 |
| 1,051,805 | 3/1959 | Germany | 261—114 |

NORMAN YUDKOFF, Primary Examiner

S. J. EMERY, Assistant Examiner

U.S. Cl. X.R.

196—14.52; 202—158; 261—113, 114